Nov. 29, 1938.   B. OSKIN   2,138,554
EYE TESTER
Filed Dec. 22, 1936
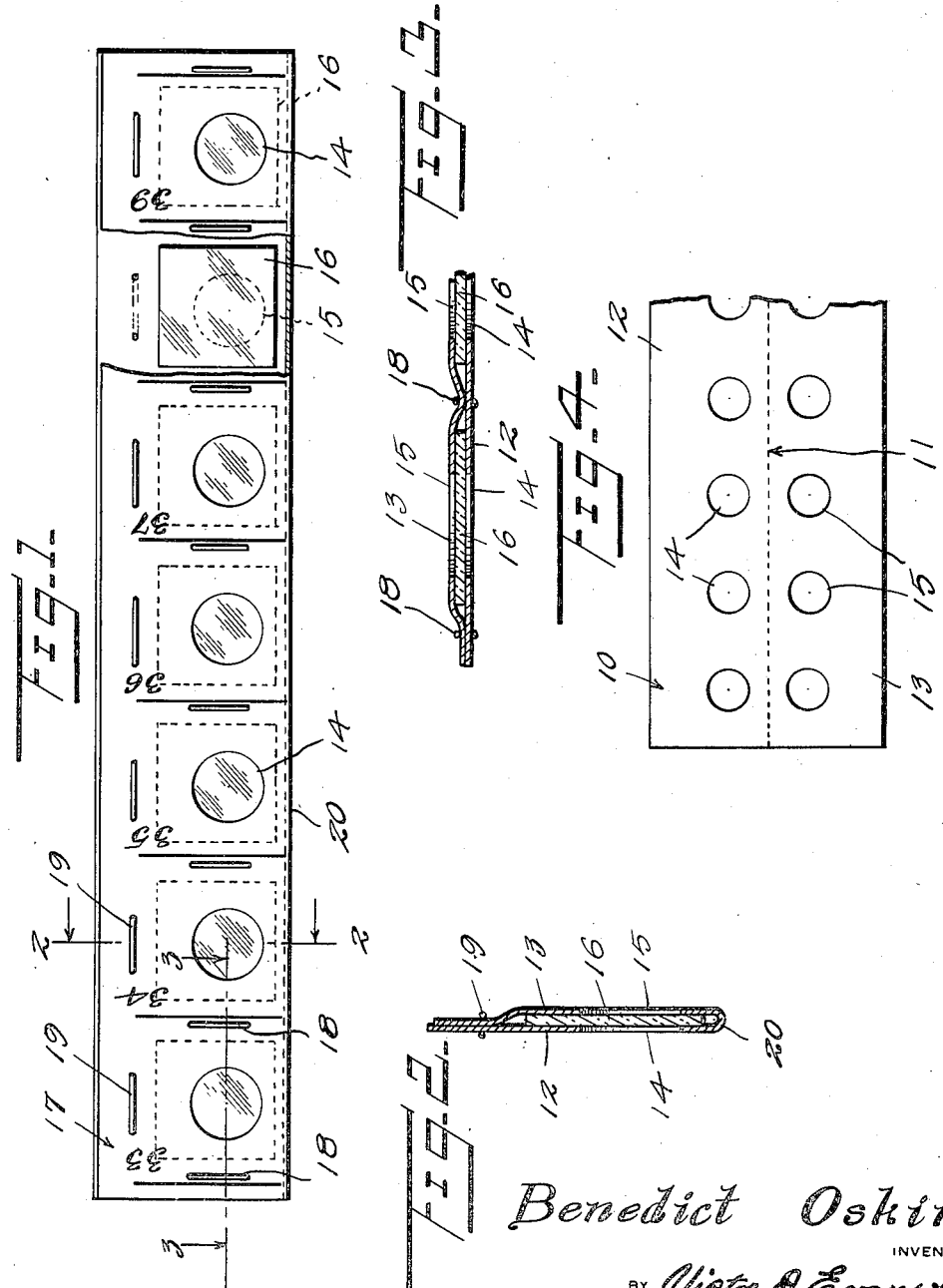
Benedict Oskin
INVENTOR
BY Victor J. Evans & Co.
ATTORNEY Patented Nov. 29, 1938

2,138,554

UNITED STATES PATENT OFFICE 2,138,554

EYE TESTER

Benedict Oskin, Chicago, Ill.

Application December 22, 1936, Serial No. 117,213

1 Claim. (Cl. 88—22)

This invention relates to eye testers and has for an object to provide an inexpensive efficient device by means of which the necessary lenses for correction may be readily and rapidly adjusted and their proper numbers simultaneously exposed to view.

A further object is to provide an eye tester comprising a flexible member of U-form in cross section and provided in both sides thereof with registering openings, lenses of different focuses being applied to the flexible member across the openings of the latter and being held in place by vertical clips arranged between the openings and passing through both sides of the flexible member and by horizontal clips arranged above the lenses and passed through both sides of the flexible member, such construction providing an inexpensive eye tester which will be light, strong and durable, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a front elevation of an eye tester constructed in accordance with the invention.

Figure 2 is a cross sectional view taken on the line 2—2 of Figure 1.

Figure 3 is a fragmentary longitudinal sectional view taken on the line 3—3 of Figure 1.

Figure 4 is a detail plan view of the blank of material before folding to provide the frame for the lenses.

Referring now to the drawing in which like characters of reference designate similar parts in the various views, 10 designates a rectangular blank of flexible material which may be folded longitudinally upon a median score line 11 to provide a frame member of U-form in cross section. The frame member is provided in both sides 12 and 13 with registering openings 14 and 15. Lenses 16 of different focuses are arranged in the frame across the openings and displayed upon the front of one of the sides are numerals 17 indicating the strength of the particular lens to which the numeral refers.

The lenses are held in place by vertical clips 18 arranged between adjacent openings in each row of openings in the front and back sides of the frame. The clips pass through both sides of the member. Horizontal clips 19 are arranged above the lenses and pass through both sides of the frame member. The horizontal clips and the vertical clips associated with each lens coact with the bight 20 of the frame member in rigidly securing the lens in place.

The blank 10 of material from which the frame of U-form is constructed, may be of any desired material but preferably is of flexible material so that the tester may be held flat against the patient's eyes in position to conform to the contour of the face and forehead.

In operation the tester may be passed across each eye of the patient in turn, from left to right until the lens which makes vision clearest registers with the eye. Thereupon the corresponding numeral 17 may be read to determine the strength of the lens which is required for that eye for correction.

From the above description it is thought that the construction and operation of the invention will be fully understood without further explanation.

What is claimed is:

An eye tester comprising a rectangular blank of flexible material folded longitudinally upon a median score line to provide a frame member of U-form in cross section, the frame member being provided in both sides with registering openings, lenses of different respective focuses arranged in the frame across the openings, numerals displayed upon the front of one of the sides of the frame indicating the strength of the particular lens to which each numeral refers, clips extending transversely of the strip between adjacent openings in each row of openings and passing through both sides of the member, clips extending longitudinally of the member above the lenses and passing through both sides of the member, the transverse clips and the longitudinal clips coacting with the bight at the score line of the frame member in rigidly securing the lenses in place, said frame member being adapted to be held in front of the patient's eyes and to be deformed at the transversely extending clips to conform to the contour of the face and forehead while being moved to dispose the lenses in sequence at each eye of the patient in turn from left to right until the lens which makes the vision clearest registers with the eye whereupon the corresponding one of said numerals may be read to determine the strength of the lens which is required for correction of vision of that eye.

BENEDICT OSKIN.